United States Patent
Leung et al.

(10) Patent No.: US 8,059,553 B2
(45) Date of Patent: Nov. 15, 2011

(54) ADAPTIVE INTERFERENCE CONTROL

(75) Inventors: Hang Ching Jason Leung, Yuen Long (HK); Piu Bill Wong, Causeway Bay (HK); Kin Nang Lau, Tseung Kwan O (HK)

(73) Assignee: FiMax Technology Limited, George Town (KY)

( * ) Notice: Subject to any disclaimer, the term of this patent is extended or adjusted under 35 U.S.C. 154(b) by 1118 days.

(21) Appl. No.: 11/842,864

(22) Filed: Aug. 21, 2007

(65) Prior Publication Data

US 2009/0052411 A1    Feb. 26, 2009

(51) Int. Cl.
*H04L 12/28* (2006.01)

(52) U.S. Cl. ......... 370/252; 370/458; 375/346; 455/522

(58) Field of Classification Search .................. 370/229, 370/252, 254, 278, 328, 335, 329, 334; 375/346; 455/522

See application file for complete search history.

(56) References Cited

U.S. PATENT DOCUMENTS

| | | | |
|---|---|---|---|
| 6,233,466 B1 | 5/2001 | Wong et al. | |
| 6,519,705 B1 * | 2/2003 | Leung | 713/300 |
| 7,450,948 B2 * | 11/2008 | Argyropoulos et al. | 455/452.1 |
| 2004/0047324 A1 * | 3/2004 | Diener | 370/338 |
| 2005/0100119 A1 | 5/2005 | Husted et al. | |
| 2005/0110683 A1 | 5/2005 | Song et al. | |
| 2005/0255892 A1 | 11/2005 | Wong et al. | |
| 2007/0218949 A1 * | 9/2007 | Cleveland | 455/561 |
| 2007/0238414 A1 * | 10/2007 | Cleveland et al. | 455/63.1 |
| 2008/0081564 A1 * | 4/2008 | Rao | 455/63.1 |
| 2010/0142465 A1 * | 6/2010 | Medepalli et al. | 370/329 |

* cited by examiner

*Primary Examiner* — Jung Park
(74) *Attorney, Agent, or Firm* — Fulbright & Jaworski L.L.P.

(57) ABSTRACT

Systems and methods which control communications in a carrier sense multiple access environment to provide a balance between communication sensitivity and transmission availability are shown. Adaptive interference control techniques of embodiments operate to determine a media error time metric representing the time associated with receiving interfering signals. The media error time metric of embodiments is used to adjust operation of various network systems in order to adjust communication sensitivity and/or transmission availability. Desensitizing thresholds and sensitizing thresholds may be used to define operating boundaries, such that desensitizing thresholds are used to control network desensitize actions which result in decreased error times and sensitizing thresholds are used to control network sensitizing actions which result in increased error times. Error time metrics and corresponding desensitizing and sensitizing thresholds may be utilized with respect to a plurality of radios. Embodiments provide for adjustment of control parameters based upon historical operation.

39 Claims, 7 Drawing Sheets

ADAPTIVE INTERFERENCE CONTROL

TECHNICAL FIELD

The invention relates generally to communications and, more particularly, to providing communication interference control.

BACKGROUND OF THE INVENTION

Communication systems, whether wireless or wireline, are susceptible to interference, whether in the form of external noise or interfering signals from various stations of the communication systems themselves. Many schemes and protocols have been implemented to facilitate communications despite interference.

One protocol which has been widely implemented with respect to networks, such as local area networks (LANs) and metropolitan area networks (MANs), carrier sense multiple access (CSMA). In CSMA, stations (user stations, access points, routers, servers, etcetera) monitor the communication media to detect when the media is busy. If the media is determined to be busy, a station will not transmit. Once the media is determined to be free, a station may then utilize the media to transmit. Accordingly, CSMA provides an environment in which stations attempt to avoid interference, whether from sources external to the network or internal to the network, by monitoring the communication media and transmitting only when the communication media appears to be free.

Wireless communication networks are becoming ubiquitous. For example cellular telephone and data networks are becoming widely utilized. Wireless data networks, in particular, have seen dramatic growth in the availability and use. Accordingly, various infrastructure has been and is being developed to provide wireless data network coverage not only in the more traditional areas, such as within a home or office, but in large areas, such as throughout a metropolitan area. Wireless technologies, such as IEEE 802.11 (often referred to as "WiFi"), which were initially developed for use in servicing relatively small areas (e.g., homes and office buildings) have been deployed to provide wireless communications in much larger areas (e.g., large portions (e.g., 5 km radius) of an urban area.

Wireless networks are often desirable in that relatively little infrastructure (e.g., a basestation and backhaul trunk) may be deployed in order to serve a large service area. However, it is typically advantageous to accommodate a large number of stations through such infrastructure in order to provide a cost effective business model. For example, it is often desirable to serve as large of an area as is practicable using a single basestation in order to optimize the ratio of infrastructure costs to user revenue.

Unfortunately, not all infrastructure and their attendant protocols are particularly well suited to meet the demands of such large service area and/or high capacity deployments. For example, WiFi communication infrastructure utilizes CSMA which can result in undesired operation where a large area is served and/or a large number of stations are served. Such large service areas and/or large numbers of stations can result in the communication media utilized by a large number of stations being busy a substantial portion of the time, leaving little free time for stations to transmit. In particular, not only will a large number of stations being served in a large service area result in all stations in that service area being prevented from transmitting when any one station is transmitting, but in increasing the sensitivity of the radios in order to provide communications over the large area the radios become more susceptible to external interference. Accordingly, appreciable amounts of time may be experienced in which all stations in the service area are prevented from transmitting using CSMA due to external interference being detected on the communication media.

BRIEF SUMMARY OF THE INVENTION

The present invention is directed to systems and methods which control communications in a carrier sense multiple access (CSMA) environment to provide a desired balance between communication sensitivity and transmission availability. It should be appreciated that communication sensitivity, in a wireless network, corresponds to range or coverage area (whether line of sight, non-line of sight, clear or obstructed) whereas transmission availability corresponds to potential throughput or available capacity. Although it is typically desirable to provide both maximum range or coverage area and potential throughput or available capacity) these are often not compatible goals, particularly in a CSMA environment. Accordingly, embodiments of the invention provide a balance between these goals in order to provide network operation resulting in range or coverage area and potential throughput or available capacity optimized according to a network operator's desires.

Adaptive interference control (AIC) systems and methods are implemented according to embodiments of the present invention to provide the aforementioned desired balance between communication sensitivity and transmission availability. AIC techniques of embodiments operate to determine a media error time metric representing or approximating the time, within a measurement window, associated with receiving interfering signals. The media error time metric of embodiments is used to adjust operation of various network systems, such as one or more access point (AP) radio, in order to adjust communication sensitivity and/or transmission availability.

According to preferred embodiments of the invention, one or more desensitizing thresholds and sensitizing thresholds are selected to define operating boundaries for providing a desired balance between communication sensitivity and transmission availability. Embodiments of AIC techniques of the invention implement desensitizing thresholds to control network desensitize actions which result in decreased error times and sensitizing thresholds to control network sensitizing actions which result in increased error times. For example, if the quotient of a measurement window length and corresponding media error time metric is less than a desensitizing threshold (more error time than expected/desired is detected) a desensitize action operable to decrease AP radio sensitivity is implemented according to an embodiment of the invention. Similarly, if the quotient of a measurement window length and corresponding media error time metric is greater than a sensitizing threshold (less error time than expected/desired is detected) a sensitize action operable to increase AP radio sensitivity is implemented according to an embodiment of the invention.

AIC techniques of embodiments of the invention utilize a plurality of error time metrics. For example, a preferred embodiment of the invention utilizes a long error time metric, measured over a relatively long measurement window, to provide stable operation and a short error time metric, measured over a relatively short measurement window, to provide quick response to significant events. Each such error time metric may have a unique set of desensitizing and sensitizing thresholds associated therewith in order to achieve their respective goals.

Error time metrics and corresponding desensitizing and sensitizing thresholds of an AIC technique of the present invention are utilized with respect to a plurality of radios. For example, a plurality of WiFi radios may be controlled by an AIC system of the present invention based upon a common media error time metric and desensitizing an sensitizing threshold set. The plurality of WiFi radios may, for example, be part of a multi-sector AP.

Embodiments of the present invention provide for adjustment of control parameters based upon historical operation. For example, one or more of the foregoing desensitizing thresholds and/or sensitizing thresholds may be adjusted, and thus the maximum communication sensitivity and/or transmission availability adjusted, based upon historical information, such as a period of time since a last desensitize action or sensitize action has been taken. Such embodiments may be utilized to provide systems which are adaptive to the particular environments they are deployed within.

The foregoing, has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
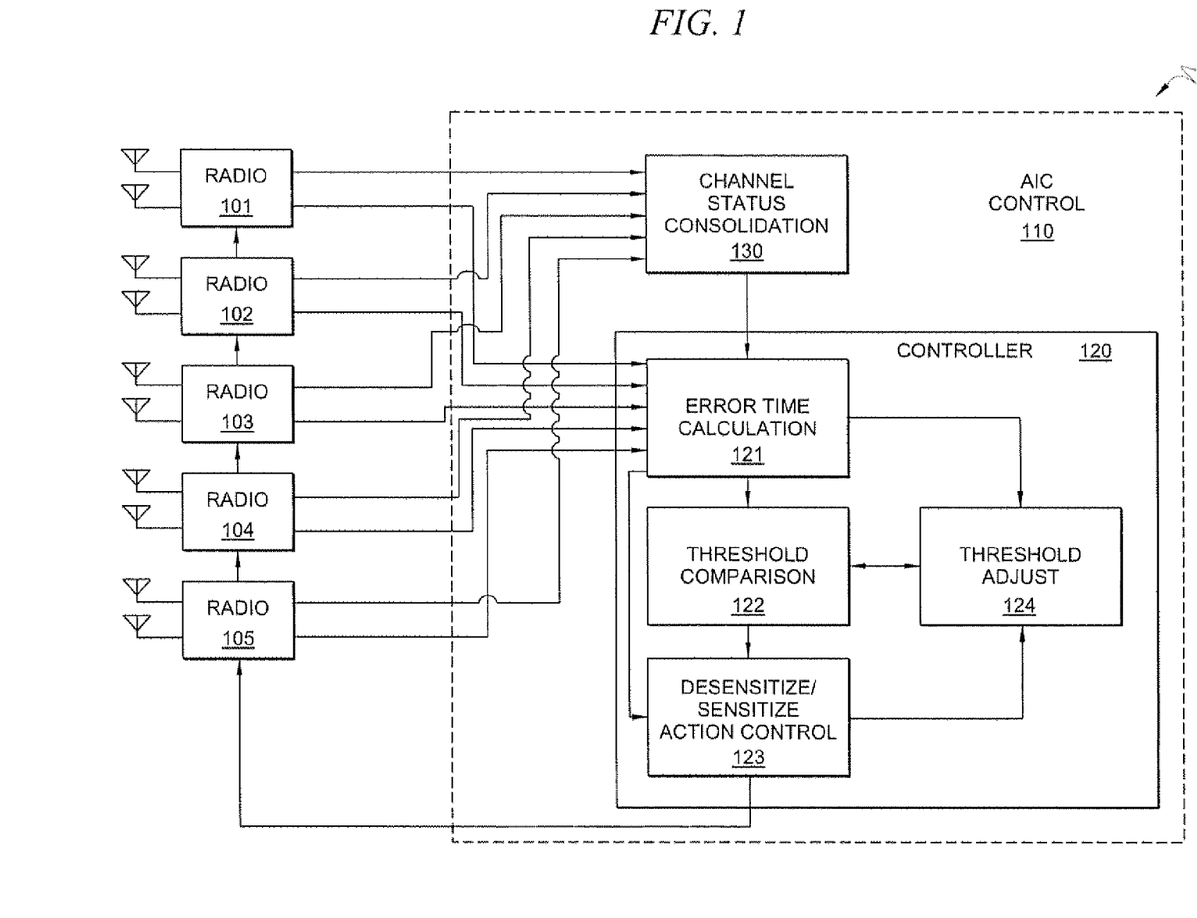
FIG. 1 shows a high level functional block diagram of a system adapted according to an embodiment of the present invention.

Directing attention to FIG. 1, a high level functional block diagram of a system adapted according to an embodiment of the present invention is shown. Specifically, access point (AP) 100 adapted to provide adaptive interference control (AIC) according to concepts of the present invention is shown. AP 100 preferably provides wireless communication within a relatively large service area, such as a service area having a radius in the range of approximately 0.5-5 km, using a carrier sense multiple access (CSMA) protocol.

To provide high quality, high bandwidth communications throughout the service area, AP 100 of the illustrated embodiment utilizes a plurality of radios (shown here as radios 101-105). Radios 101-105 of a preferred embodiment provide communications in accordance with the IEEE 802.11 standards (e.g., 802.11(b) and/or 802.11(g)), and thus employ CSMA in providing WiFi communications. Accordingly, radios 101-105 of embodiments of the invention may comprise the AR2413 802.11 compliant radio chip sets available from Atheros Communications. Inc.

In the illustrated embodiment each of radios 101-105 includes two antennas coupled thereto, wherein each antenna may provide a beam (directional or omni-directional) oriented to provide communications in a selected portion of the service area. According to a preferred embodiment, radios 102-105 are used to provide illumination of respective portions of the service area (e.g., overlapping or non-overlapping portions of the service area) while radio 101 is used to provide a special communication link, such as a backhaul link with a point of presence (POP), an inter-network link between network nodes (e.g., a link between AP 100 and a pico-cell), etcetera.

According to embodiments of the present invention, a variety of antenna configurations may be utilized simultaneously. For example, the antennas associated with each of radios 102-105 may be configured to provide relatively broad beams, such as 90° or 45° beams, in order to illuminate a 360° area around AP 100, whereas the antennas associated with radio 101 may be configured to provide relatively narrow beams, such as 20° or 10° beams, in order to provide point-to-point communication for a backhaul link. The antennas may be adapted to provide spatial, angular and/or polarization diversity. For example, the antennas associated with radio 102 may be physically spaced apart to provide spatial diversity within a portion of the service area served by radio 102. Additionally or alternatively, the antennas associated with radio 102 may be pointed along a different azimuthal angle to provide angular diversity within a portion of the service area served by radio 102. Similarly, the antennas associated with radio 102 may be provided different polarizations (e.g., one vertical and one horizontal or one slant left and one slant right) to provide angular diversity within a portion of the service area served by radio 102. The antennas associated with radios 103-105 may be likewise configured, thereby providing not only spatial, angular, and/or polarization diversity with respect to the antennas of any particular radio, but also to provide spatial, angular, and/or polarization diversity with respect to the antennas of different radios. It should be appreciated that the antennas of any particular radio as well as the antennas of the different radios may be configured to provide fully overlapping beams, partially overlapping beams, non-overlapping beams, and combinations thereof.

Figure 2:
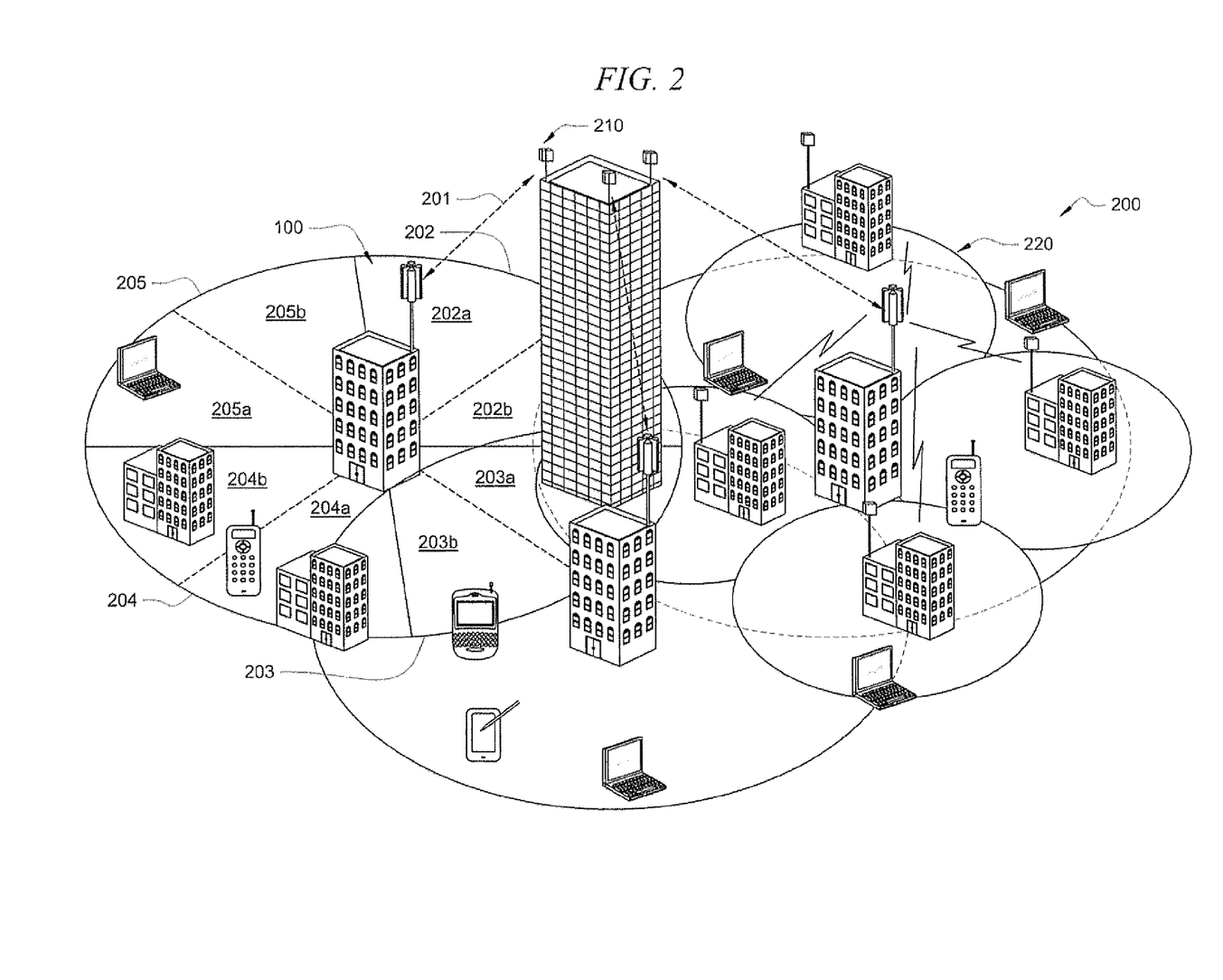
FIG. 2 shows the system of FIG. 1 deployed in a network according to an embodiment of the invention.

AP 100 is preferably part of a larger network system, such as shown in FIG. 2. Specifically, FIG. 2 shows metropolitan area network (MAN) 200 in which a plurality of service area cells are defined by various access points, such as AP 100 providing a micro-cell and AP 220 providing a pico-cell. In the illustrated embodiment, radio 101 provides backhaul link 201 between AP 100 and POP 210. POP 210 preferably provides a hub site with network access, such as through an optical fiber link, trunk lines, etcetera. Radios 102-105 provide communication within service area portions 202-205 respectively. It should be appreciated that the antennas associated with radios 102-105 may be configured to provide overlapping coverage within the corresponding service area portion (e.g., antennas associated with radio 102 each provide overlapping 90° coverage within service area portion 202, antennas associated with radio 103 each provide overlapping 90° coverage within service area portion 203, antennas associated with radio 104 each provide overlapping 90° coverage within service area portion 204, and antennas associated with radio 105 each provide overlapping 90° coverage within service area portion 205) or be configured to provide non-overlapping coverage within the corresponding service area portion (e.g., antennas associated with radio 102 each provide non-overlapping 45° coverage within a respective one of service area portions 202*a* and 202*b*, antennas associated with radio 103 each provide non-overlapping 45° coverage within a respective one of service area portions 203*a* and 203*b*, antennas associated with radio 104 each provide non-overlapping 45° coverage within a respective one of service area portions 204*a* and 204*b*, and antennas associated with radio 105 each provide non-overlapping 45° coverage within a respective one of service area portions 205*a* and 205*b*).

It should be appreciated that the service area formed by service area portions 202-205 is relatively large and may encompass a large number of user stations. Moreover, the radios of AP 101 may be exposed to appreciable sources of noise or interference, such as access points of adjacent cells, etcetera. Accordingly, the communication media shared the large number of user stations served by AP 101 may be determined to be busy according to the CSMA protocol a substantial portion of the time, leaving little free time for stations to transmit. Accordingly, AP 101 of the illustrated embodiment is adapted to control communications in the CSMA environment to balance between communication sensitivity and transmission availability in order to provide network operation resulting in range or coverage area and potential throughput or available capacity optimized according to a network operator's desires.

Directing attention again to FIG. 1, AP 101 includes adaptive interference control (AIC) control 110 operable to provide the aforementioned balance between communication sensitivity and transmission availability. AIC control 110 is preferably in communication with each of radios 101-105 in order to receive information from the radios (e.g., channel status information, information with respect to data transmission by the radios, information with respect to data reception by the radios, error information, etcetera) and to provide information to the radios (e.g., control parameters, information requests, etcetera).

The illustrated embodiment of AIC control 110 includes controller 120 and channel status consolidation 130. Although AIC control 110 may be implemented in any number of configurations, a preferred embodiment of the invention implements channel status consolidation 130 using a field programmable gate array (FPGA) and controller 120 using a processor (e.g., a XScale 425 processor available from Intel Corporation) operating under control of an instruction set (e.g., firmware) so as to provide an inexpensive configuration which is readily deployable within a portable housing for deployment as an access point. Of course, other embodiments are possible according to the concepts of the present invention, including implementing, channel status consolidation 130 using an instruction set operable upon the same processor as provided for controller 120.

AIC control 110 of the illustrated embodiment operates to determine a media error time metric representing the time, within a measurement window, associated with receiving interfering signals. Error time is the time the media, as experienced by a station, has error signals therein, whether the error signals are from external interference or from internal communications not intended for the station. Error time may be approximated, according to embodiments of the invention through counting error data packets, error time slots, etcetera. It should be appreciated that, although embodiments are described herein with reference to "error time," the concepts of the present invention apply to any measure of the time media is unavailable for transmission by a station. Thus, one of ordinary skill in the art will appreciate that metrics such as good time (the time the media is available for communication) may be used synonymously with error time for embodiments of the invention.

The aforementioned media error time metric is used to adjust operation of one or more of radios 101-105 in order to adjust communication sensitivity and/or transmission availability. For example, the media error time metric determined from the time associated with receiving interfering signals by radios 101-105 may be utilized to adjust communication sensitivity of one or more of radios 101-105 providing communication with respect to AP 100.

Because radios 101-105 are linked together as a single access point, embodiments of the present invention operate to adjust their sensitivity using common media error time measurements and algorithms. However, the concepts of the present invention facilitate implementation of different metrics and algorithms with respect to different radios, if desired. For example, communication sensitivity of radio 101 may be adjusted separately, perhaps using a separately determined media error time metric determined from the time associated with receiving interfering signals by radio 101, because radio 101 may experience a different channel environment than radios 102-105 due to radio 101 providing a backhaul communication link between AP 100 and POP 210. Accordingly, it should be appreciated that all radios, any combination of radios, or any single radio may be controlled using media error time metrics according to the concepts of the present invention.

In operation according to a preferred embodiment of the invention, each of radios 101-105 provides a signal output showing the instantaneous radio frequency (RF) channel status (i.e., idle/busy), referred to herein as CHANNEL_CLEAR. These CHANNEL_CLEAR signals are provided to channel status consolidation 130 for consolidation in order to provide a media error time metric applicable to a plurality of radios. According to an embodiment, because each of radios 101-105 are linked together as a single access point, the CHANNEL_CLEAR signal for each of radios 101-105 is consolidated to provide a representative channel status for radios 101-105.

To provide channel status consolidation according to an embodiment of the invention, channel status consolidation 130 performs a logic AND operation with respect to the CHANNEL_CLEAR signals provided by radios 101-105. Performing a logic AND with respect to the CHANNEL_CLEAR signals provides a consolidated view of when the media is busy which is useful in controlling the plurality of radios of AP 100. A signal representing the consolidated channel status, referred to herein as CHANNEL_CLEAR_CON, is provided to controller 120 for further processing.

In addition to outputting the foregoing CHANNEL_CLEAR signals, each of radios 101-105 of a preferred embodiment provides a signal output showing the RF channel receive count, referred to herein as RX_COUNT, and the RF channel transmit count, referred to herein as TX_COUNT. The RX_COUNT and TX_COUNT signals provide a clock cycle count with respect to when a radio received or transmitted data intended for that radio. The RX_COUNT and TX_COUNT signals for each of radios 101-105 are provided to controller 120 for AIC control processing according to embodiments of the present invention.

Error time calculator 121 of controller 120 utilizes the foregoing CHANNEL_CLEAR_CON signal and RX_COUNT and TX_COUNT signals to calculate an error time used for AIC control processing according to an embodiment of the invention. Initially, error time calculator 121 of a preferred embodiment operates to provide time based information with respect to the CHANNEL_CLEAR_CON signal for use in applying time based AIC control (e.g., time averaged over one or more sampling windows). Accordingly, error time calculator 121 of an embodiment counts the number of clock cycles CHANNEL_CLEAR_CON indicates the media is busy to provide a consolidated channel status count signal, referred to herein as CHANNEL_CLEAR_COUNT. Embodiments of the invention increment CHANNEL_CLEAR_COUNT to include periods when the media is not actually busy so as to include times the media is unavailable according to the underlying protocol. For example, the 802.11 standards provide for a 60 μs backoff period after a media busy transition. Accordingly, the busy count of CHANNEL_CLEAR_COUNT of embodiments of the invention is increased by a number of clock cycles equal to this backoff period for each busy to idle transition. Of course, various other incrementing and decrementing rules may be utilized, such as based upon the underlying protocol, system performance parameters, operational objectives, etcetera.

Although CHANNEL_CLEAR_COUNT provides a consolidated view of when the media is busy as experienced by the radios of AP 100, this information alone does not provide information as to transmission availability because CHANNEL_CLEAR_COUNT will indicate the media being busy even when it is a radio of AP 100 which is receiving or transmitting the signal. That is, the CHANNEL_CLEAR signal not only indicates that the media is busy when noise or interference at the carrier frequency is experienced by the receiver (referred to herein as error signals), but also indicates that the media is busy when valid packets are transmitted or received.

Accordingly, to determine a media error time referred to herein as ERROR_TIME, providing information with respect to the receiving of error signals by the radios of AP 100, embodiments of error time calculation 121 reduce the CHANNEL_CLEAR_COUNT by an amount associated with the RX_COUNT and/or TX_COUNT, thereby providing an ERROR_TIME which is indicative of the error signal count experienced by the radios of AP 100. Embodiments of error time calculation 121 calculate ERROR_TIME according to the formula below.

$$\text{ERROR\_TIME} = \text{CHANNEL\_CLEAR\_COUNT} - \max(RX\_COUNT, TX\_COUNT) \quad (1)$$

The maximum function is used with respect to RX_COUNT and TX_COUNT according to embodiments of the invention because the plurality of radios in AP 100 will typically interact such that transmission from one is received by another. Accordingly, use of the maximum function is likely to provide a more accurate representation of the non-error signals associated with AP 100. It should be appreciated that each radio may provide a different value for RX_COUNT and likewise each radio may provide a different value for TX_COUNT. Accordingly, the RX_COUNT and TX_COUNT used in equation (1) may be the RX_COUNT having the greatest value and the TX_COUNT having the greatest value, which may or may not be associated with the same radio. The use of TX_COUNT and RX_COUNT having the greatest value provides an ERROR_TIME result which includes the maximum error time experienced by a radio of the plurality of radios. In embodiments where RX_COUNT and TX_COUNT do not include overlapping counts with respect to transmissions by the radio of AP 100, the maximum function used in equation (1) above may be omitted.

The foregoing ERROR_TIME provides an error signal count over a period of time. Preferred embodiments utilize one or more error signal counts in order to provide AIC control. For example, a long error time metric may be utilized to provide stable operation and a short error time metric may be utilized to provide quick response to significant events. Accordingly, ERROR_TIME metrics and their corresponding collection period time, referred to herein as PERIOD_TIME, for a short time period and a long time period may be used to provide metrics used in AIC control according to the concepts of the present invention. An embodiment of the present invention utilizes a metric determined with respect to a short time period, referred to herein as SHORT_METRIC, determined according to the formula below.

$$\text{SHORT\_METRIC} = \text{PERIOD\_TIME}_S / \text{ERROR\_TIME}_S \quad (2)$$

Wherein PERIOD_TIME$_S$ comprises the time period over which ERROR_TIME$_S$ was determined, and PERIOD_TIME$_S$ comprises a relatively short period of time (e.g., 1 second). The foregoing exemplary embodiment of the invention further utilizes a metric determined with respect to a long time period, referred to herein as LONG_METRIC, determined according to the formula below, $$\text{LONG\_METRIC} = \text{PERIOD\_TIME}_L / \text{ERROR\_TIME}_L \quad (3)$$

Wherein PERIOD_TIME$_L$ comprises the time period over which ERROR_TIME$_L$ was determined, and PERIOD_TIME$_L$ comprises a relatively long period of time (e.g., 10 seconds). Each of PERIOD_TIME$_S$ and PERIOD_TIME$_L$ comprise windows of time which may be provided as sliding windows throughout operation of AP 100.

It should be appreciated that each of SHORT_METRIC and LONG_METRIC of the foregoing exemplary embodiment may range from 1 (i.e., PERIOD_TIME=ERROR_TIME, meaning that all received signals are error signals and there is no transmission availability at the access point) to infinity (i.e., ERROR_TIME=0, meaning that no error signals were received and there is transmission availability at the access point). It can be seen that the foregoing extremes are unlikely to provide a desired balance with respect to communication sensitivity and transmission availability. For example, where the error time metric (either SHORT_METRIC or LONG_METRIC) is infinity, it is likely that radio sensitivity has been decreased to a point that desired/desirable communications have been eliminated (e.g., stations disposed near the edges of service area portions 202-205 of FIG. 2 are not being served by AP 101). Where the error time metric (either SHORT_METRIC or LONG_METRIC) is 1, it is likely that the radio sensitivity has been increased to a point that error signals have blocked all communications. Accordingly, embodiments of the invention operate to provide control of radios 101-105 such that the error time metrics are reasonably maximized while employing some level of receive sensitivity. In operation according to a preferred embodiment, a percentage of blockage caused by error time is used in selecting error time operational metrics. For example, it may be decided that a high transmission usage, such as 80%, is desired and thus error times up to 20% are acceptable in operation according to the foregoing.

Embodiments of the invention implement one or more desensitizing thresholds (threshold values for decreasing access point radio sensitivity and/or increasing access point transmission availability) and sensitizing thresholds (threshold values for increasing access point radio sensitivity and/or decreasing access point transmission availability) to define operating boundaries with respect to error time metrics (e.g., the foregoing SHORT_METRIC and/or LONG_METRIC) for providing a desired balance between communication sensitivity and transmission availability. Accordingly, AIC control 110 of embodiments of the invention implements desensitizing thresholds to control network desensitize actions which result in decreased error times and sensitizing thresholds to control network sensitizing actions which result in increased error times. According to the illustrated embodiment, signals representing the above described SHORT_METRIC and LONG_METRIC are provided by error time calculation 121 to threshold comparison 122 for comparison to threshold values and determining control action to be taken by AIC control 110.

Figure 3:
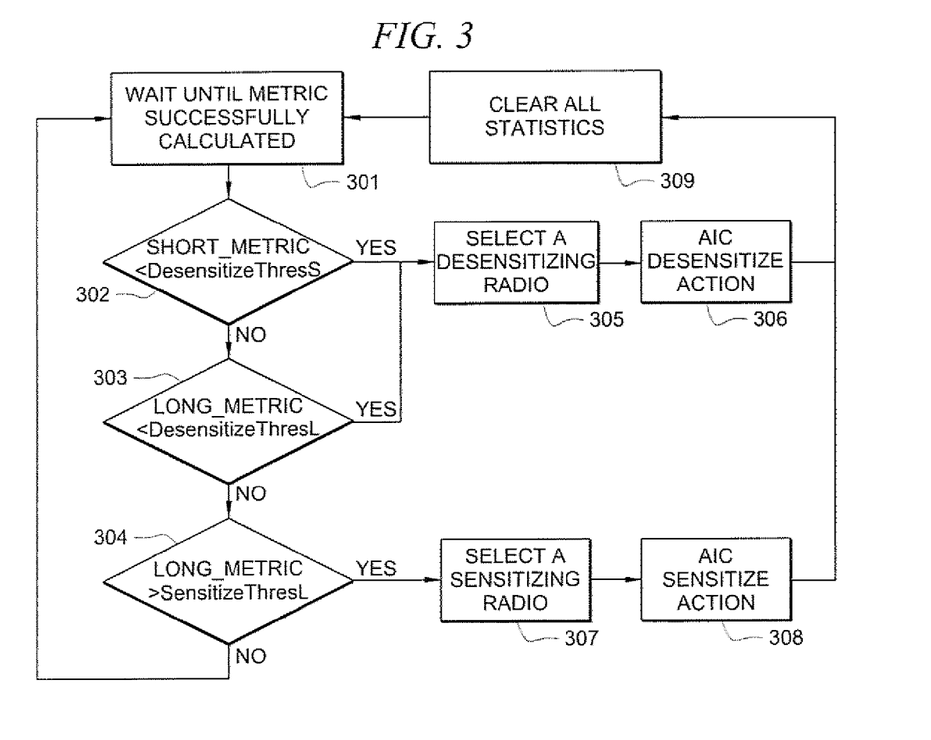
FIG. 3 shows a flow diagram of operation of the system of FIG. 1 to provide adaptive interference control according to an embodiment of the invention.

Directing attention to FIG. 3, a flow diagram showing operation of threshold comparison 122 and desensitize/sensitize action control 123 to provide threshold comparison and control of radios 101-105 according to an embodiment of the invention. At block 301 of FIG. 3, threshold comparison 122 awaits error time metric calculations by error time calculation 121. Upon threshold comparison 122 receiving an appropriate error time metrics (e.g., SHORT_METRIC and/or LONG_METRIC), processing proceeds to block 302.

At block 302 a determination is made as to whether SHORT_METRIC is below a short desensitize threshold (referred to herein as DesensitizeThresS). The short desensitize threshold is preferably set to a relatively strict value (i.e., a value smaller than the long desensitize threshold) in order to facilitate a quick response to an extreme, hostile situation without unnecessarily compromising operational stability. For example, DesensitizeThresS may be selected to be in the range of 2-3 (where a value of 2.5 represents approximately 40% error time). If it is determined at block 302 that SHORT_METRIC is less than DesensitizeThresS, then processing proceeds to blocks 305 and 306 wherein desensitize/sensitize action control 123 operates to provide AIC control with respect to one or more of radios 101-105. However, if it is determined at block 302 that SHORT_METRIC is not less than DesensitizeThresS, the processing proceeds to block 303.

At block 303 a determination is made as to whether LONG_METRIC is below a long desensitize threshold (referred to herein as DesensitizeThresL). The long desensitize threshold is preferably set to provide a more general channel situation analysis such that the algorithm operates to fine tune radio sensitivity over time. For example, DesensitizeThresL may be selected to be in the range of 3-4 (where a value of 3.5 represents approximately 30% error time). If it is determined at block 303 that LONG_METRIC is less than DesensitizeThresL, then processing proceeds to blocks 305 and 306 wherein desensitize/sensitize action control 123 operates to provide AIC control with respect to one or more of radios 101-105. However, if it is determined at block 303 that LONG_METRIC is not less than DesensitizeThresL, the processing proceeds to block 304.

As discussed above, at blocks 305 and 306 desensitize/sensitize action control 123 operates to provide AIC control with respect to one or more of radios 101-105. In operation according to a preferred embodiment, desensitize/sensitize action control 123 operates to determine which radio or radios to apply a desensitize action to. For example, although the error time metrics used by threshold comparison 122 of embodiments comprise consolidated information with respect to radios 101-105, embodiments operate to adjust the sensitivity of a particular one of radios 101-105 experiencing the most extreme error signal conditions. Accordingly, error time calculation 121 of embodiments provides desensitize/sensitize action control 123 values representing the errors received over a period of time (e.g., PERIOD_TIME corresponding to that of the appropriate one of SHORT_METRIC or LONG_METRIC, a predetermined time period different than PERIOD_TIME, etcetera) for individual radios for use by desensitize/sensitize action control 123 in selecting a particular one of radios 101-105 for AIC control. Embodiments of the invention operate to select a radio having a largest error time (e.g., in the foregoing embodiment wherein error time is approximated through error counts, the radio having a largest value of errors received) over the period of time for AIC desensitize action.

It should be appreciated that a plurality of radios may be selected for AIC desensitize action at block 305 according to embodiments of the present invention. For example, the two radios having the first and second largest value of errors received over the period of time may be selected for AIC desensitize action.

At block 306, desensitize/sensitize action control 123 provides control signals to a radio selected at block 305 for taking a desired AIC desensitize action. For example, a control signal provided by desensitize/sensitize action control 123 may cause a selected radio of radios 101-105 to decrease the receive sensitivity.

As discussed above, a plurality of radios may be selected for AIC desensitize action at block 305. In such an embodiment, desensitize/sensitize action control 123 preferably provides control signals to each such radio for taking desired AIC desensitize action. It should be appreciated that the AIC desensitize action taken with respect to each such radio of the plurality of radios need not be the same according to embodiments of the invention. For example, a radio having the first largest value of errors received may be controlled to decrease receive sensitivity to a greater extent than a radio having the second largest value of errors received.

At block 304, a determination is made as to whether LONG_METRIC is above a sensitize threshold (referred to herein as SensitizeThresL). As with the long desensitize threshold, the sensitize threshold is preferably set to provide a general channel situation analysis such that the algorithm operates to fine tune radio sensitivity over time. For example, SensitizeThresL may be selected to be in the range of 13-17 (where a value of 15 represents approximately 10% error time). If it is determined at block 304 that LONG_METRIC is greater than SensitizeThresL, then processing proceeds to blocks 307 and 308 wherein desensitize/sensitize action control 123 operates to provide AIC control with respect to one or more of radios 101-105. However, if it is determined at block 304 that LONG_METRIC is not greater than SensitizeThresL, the processing returns to block 301.

It should be appreciated that the embodiment of the general AIC flow illustrated in FIG. 3 does not provide for an AIC sensitize action in response to SHORT_METRIC being above a sensitize threshold (e.g., SensitizeThresS). Although embodiments of the invention may implement AIC sensitize action as a function of a short error time metric, alternative embodiments of the invention do not to avoid increasing the sensitivity of one or more radio in response to a short quiet period. Specifically, although even relatively short periods of excessively high levels of error signals can result in substantial and even catastrophic network performance degradation, short periods of excessively low levels of error signals typically do not result in appreciable network performance degradation, and instead may represent service issues with respect to one or a very few users and more likely merely represent a period of inactivity.

As discussed above, at blocks 307 mid 308 desensitize/sensitize action control 123 operates to provide AIC control with respect to one or more of radios 101-105. In operation according to a preferred embodiment, desensitize/sensitize action control 123 operates to determine which radio or radios to apply a sensitize action to. For example, although the error time metrics used by threshold comparison 122 of embodiments comprise consolidated information with respect to radios 101-105, embodiments operate to adjust the sensitivity of a particular one of radios 101-105 experiencing the least error signal conditions. Accordingly, error time calculation 121 of embodiments provides desensitize/sensitize action control 123 values representing the errors received over a period of time (e.g., PERIOD_TIME corresponding to that of the appropriate one of SHORT_METRIC or LONG_METRIC, a predetermined time period different than PERIOD_TIME, etcetera) for individual radios for use by desensitize/sensitize action control 123 in selecting a particular one of radios 101-105 for AIC control. Embodiments of the invention operate to select a radio having a lowest value of errors received over the period of time for AIC sensitize action.

It should be appreciated that a plurality of radios may be selected for AIC sensitize action at block 307 according to embodiments of the present invention. For example, the two radios having the first and second lowest value of errors received over the period of time may be selected for AIC sensitize action.

At block 308, desensitize/sensitize action control 123 provides control signals to a radio selected at block 307 for taking a desired AIC sensitize action. For example, a control signal provided by desensitize/sensitize action control 123 may cause a selected radio of radios 101-105 to increase the receive sensitivity.

As discussed above, a plurality of radios may be selected for AIC sensitize action at block 307. In such an embodiment, desensitize/sensitize action control 123 preferably provides control signals to each such radio for taking desired AIC sensitize action. It should be appreciate that the AIC sensitize action taken with respect to each such radio of the plurality of radios need not be the same according to embodiments of the invention. For example, a radio having the first lowest value of errors received may be controlled to increase receive sensitivity to a greater extent than a radio having the second lowest value of errors received.

In operation according to the illustrated embodiment, after desensitize/sensitize action control 123 provides AIC desensitize action (block 306) or AIC sensitize action (block 308), processing proceeds to block 309 wherein the appropriate statistics are cleared for processing a subsequent iteration of AIC control. Thereafter, processing returns to block 301.

Embodiments of the present invention operate to provide both an AIC desensitize action and an AIC sensitize action. Accordingly, rather than processing proceeding from block 306 to block 309, embodiments of the invention provide for processing proceeding from block 306 to block 304. In operation according to this embodiment of the invention, a radio of radios 101-105 having a largest value of errors for a particular time period may have its receive sensitivity reduced according to a desensitize action while a radio of radios 101-105 having a lowest value of errors for the particular time period may have its receive sensitivity increased according to a sensitize action.

Although foregoing embodiments have been discussed with reference to using common media error time measurements, as provided by channel status consolidation 130 for providing sensitize and threshold actions, embodiments of the present invention provide for the use of information provided from the various radios, as is available at channel status consolidation 130, separately. For example, the information provided by any of radios 101-105 may be used to determine error time metrics associated with a corresponding one of these radios, such as for use in adjusting the communication sensitivity of a particular radio separately. Accordingly, all radios any combination of radios, or any single radio may be controlled using media error time metrics according to embodiments of the present invention.

Radios 101-105 utilized according to embodiments of the present invention provide communications using a plurality of different modulation schemes. For example, where radios 101-105 provide communications conforming to the IEEE 802.11(g) standard, communications may be provided using a complementary code keying (CCK) modulation scheme and/or an orthogonal frequency division multiplex (OFDM) modulation scheme. Embodiments of the present invention, therefore, operate to select not only one or more particular radios for application of desensitize and sensitize actions, but also operate to select one or more appropriate modulation scheme of the plurality of modulations schemes used by the radio for application of desensitize and sensitize actions.

For example, error time calculation 121 of embodiments may, in addition to or in the alternative to providing values representing the total errors received by individual radios over a period of time, provide values representing the errors associated with each of a plurality of modulation schemes received by individual radios over a period of time to desensitize/sensitize action control 123. The error values for each modulation scheme may be used by desensitize/sensitize action control 123 in selecting a particular one or more of radios 101-105 for AIC control. For example, embodiments of the invention operate to select a radio having a highest total value of errors received (for an AIC desensitize action) or lowest value of errors received (for an AIC sensitize action) for AIC control. Desensitize/sensitize action control 123 may then select a particular modulation scheme for which AIC control is applied (whether a desensitize action or sensitize action) based upon the individual modulation scheme error values for a selected radio. For example, where desensitize action is to be taken, a radio having the highest total error value may be selected and the particular modulation scheme (e.g., CCK or OFDM) having the highest error value for that radio may be selected for application of a desensitize action (e.g., adjusting one or more parameters associated with the selected modulation scheme to decrease the sensitivity of the radio for that modulation scheme). Similarly, where sensitize action is to be taken, a radio having the lowest total error value may be selected and the particular modulation scheme (e.g., CCK or OFDM) having the lowest error value for that radio may be selected for application of a sensitize action (e.g., adjusting one or more parameters associated with the selected modulation scheme to increase the sensitivity of the radio for that modulation scheme).

In operation of an embodiment according to the foregoing, a radio with a highest total error value may be picked as the radio to receive AIC desensitize action while a radio with the lowest total error value may be picked as the radio to receive AIC sensitize action. For the chosen radios, an embodiment of the invention compares the OFDM error value with the CCK error value. For the desensitize action radio, the modulation scheme with the higher error value may be selected as the modulation scheme for the desensitize action. Whereas for the sensitize action radio, the modulation scheme with the lower error value may be selected as the modulation scheme for the sensitize action.

Alternatively, the particular radio to receive AIC desensitize or sensitize action according to embodiments of the invention may be selected based upon a particular modulation scheme experiencing the most/least errors. For example, rather than looking to the total error value for a radio to select between radios 101-105, embodiments may look to the modulation scheme error values to select a radio and modulation scheme to receive AIC desensitize or sensitize action.

The use of modulation scheme error information according to embodiments of the invention may include normalization or other processing of the various modulation scheme error information in order to provide a meaningful comparison of the error information of various different modulation schemes. Additionally or alternatively, the use of radio error information according to embodiments of the invention may include weighting or other processing of the various radio error information in order to provide desired comparisons and/or AIC control.

Embodiments of the present invention are adapted to prevent or avoid AIC control locking on a particular radio (e.g., subsequent iterations of the flow of FIG. 3 repeatedly select a same radio for either desensitizing or sensitizing). For example, embodiments of the present invention implement an AIC level variable to provide information with respect to repetition of desensitizing and/or sensitizing of particular radios and/or modulation schemes by AIC control. The AIC level variable may, for example, be compared to a threshold value to determine if a particular radio and/or modulation scheme is to be selected for desensitize or sensitize action, may be used to weight parameters (such as error values) used in determining if a particular radio and/or modulation scheme is to be selected for desensitize or sensitize action, etcetera.

An embodiment of the invention operates to increment the AIC level variable associated with a particular radio by 1 each time a desensitize action is performed with respect to that radio. Correspondingly, the embodiment operates to decrement the AIC level variable associated with a particular radio by 1 each time a sensitize action is performed with respect to that radio. Accordingly, this AIC level variable provides information regarding the radios' relative AIC control sensitivity level. Although such AIC level variable information may be used directly in determining a radio and/or modulation scheme to receive AIC control, embodiments of the invention use this AIC level variable indirectly in the determination. For example, the error values discussed above may be divided by the AIC level before they are used by desensitize/sensitize action control 123 to select a radio and/or modulation scheme for desensitizing and sensitizing. Such an application of the AIC level variable encourages the AIC control to try reducing interference and noise on different radios.

As discussed above, embodiments of AIC control 110 provides AIC desensitize actions and/or AIC sensitize actions to decrease/increase radio sensitivity. Such AIC desensitize and sensitize actions may operate to control various parameters of radios 101-105 to provide radio sensitivity adjustment. For example, amplifier gain may be adjusted, filtering parameters may be adjusted, signal processing parameters may be adjusted, beam forming parameters may be adjusted, modulation/demodulation parameters may be adjusted, etcetera. Moreover, it should be appreciated that such radio sensitivity adjustment is not limited to various parameter changes, but rather may include any adjustment determined to provide a desired level of radio sensitivity adjustment. For example, embodiments of the present invention may operate to make physical adjustments, such as to increase/decrease antenna down-tilt.

Figure 4:
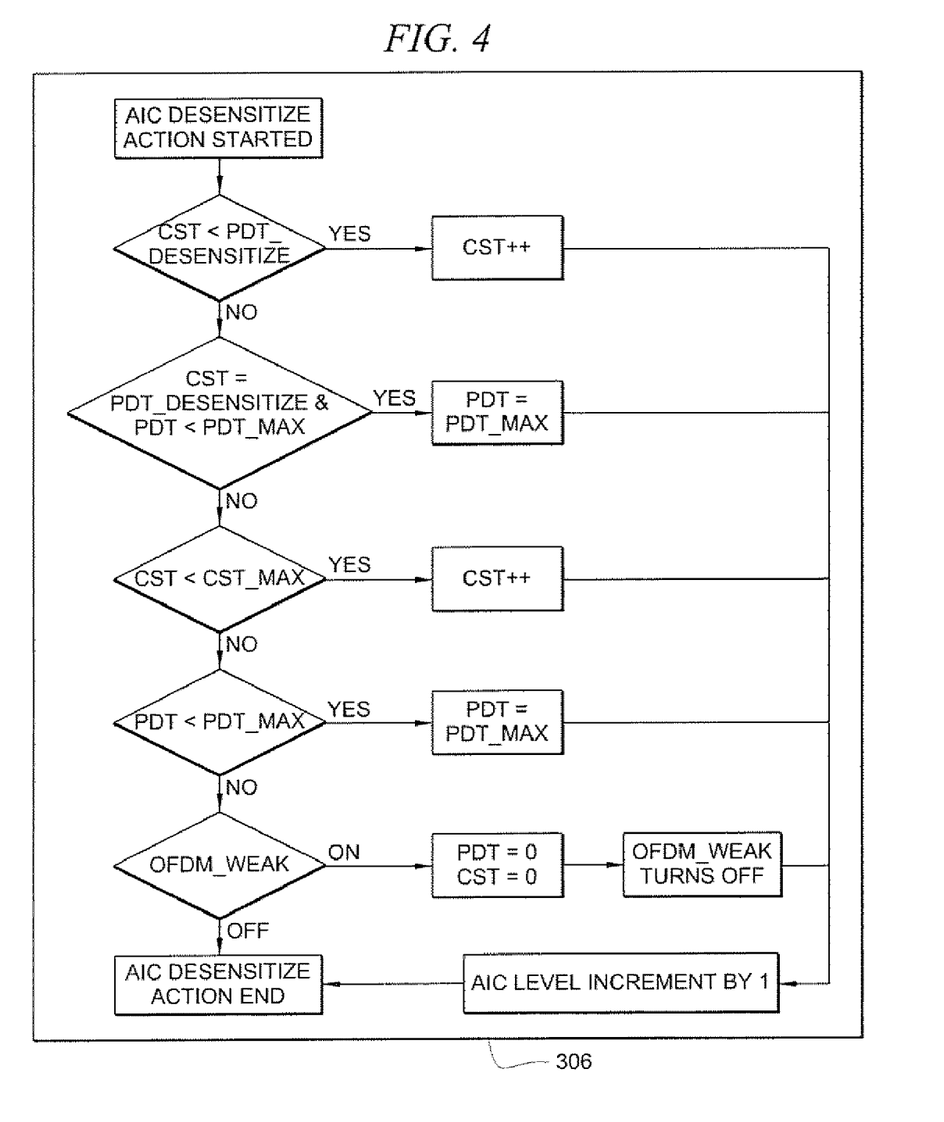
FIG. 4 shows a flow diagram of operation of the system of FIG. 1 to provide radio sensitivity desensitize action control with respect to OFDM modulation of a selected radio according to an embodiment of the invention.
Figure 5:
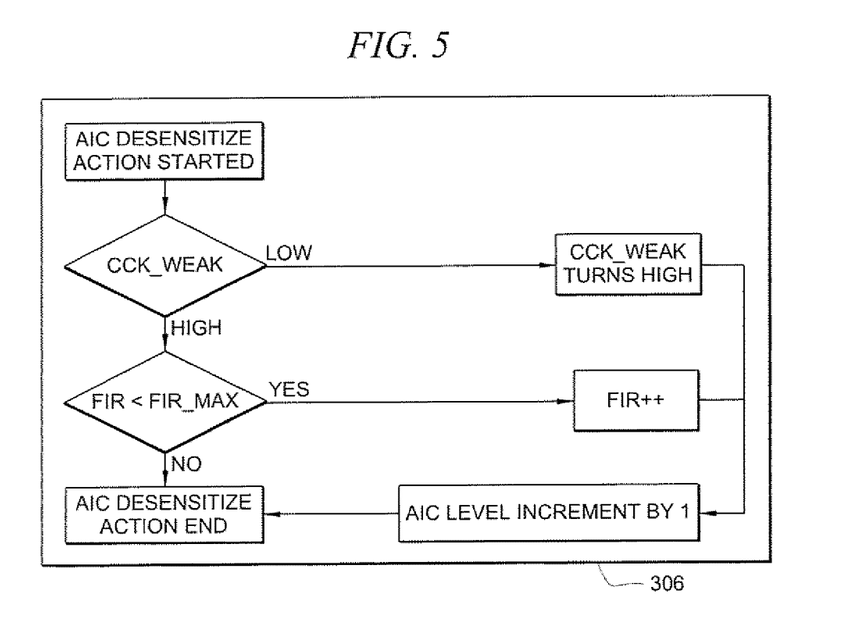
FIG. 5 shows a flow diagram of operation of the system of FIG. 1 to provide radio sensitivity desensitize action control with respect to CCK modulation of a selected radio according to an embodiment of the invention.
Figure 6:
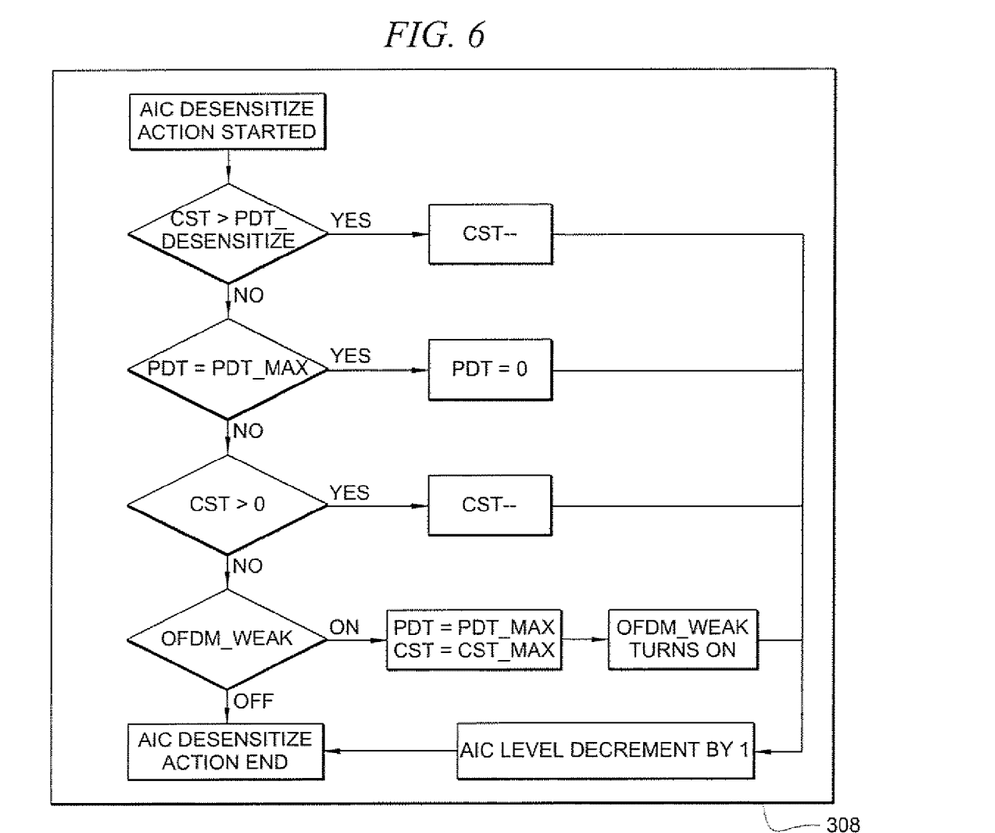
FIG. 6 shows a flow diagram of operation of the system of FIG. 1 to provide radio sensitivity sensitize action control with respect to OFDM modulation of a selected radio according to an embodiment of the invention.
Figure 7:
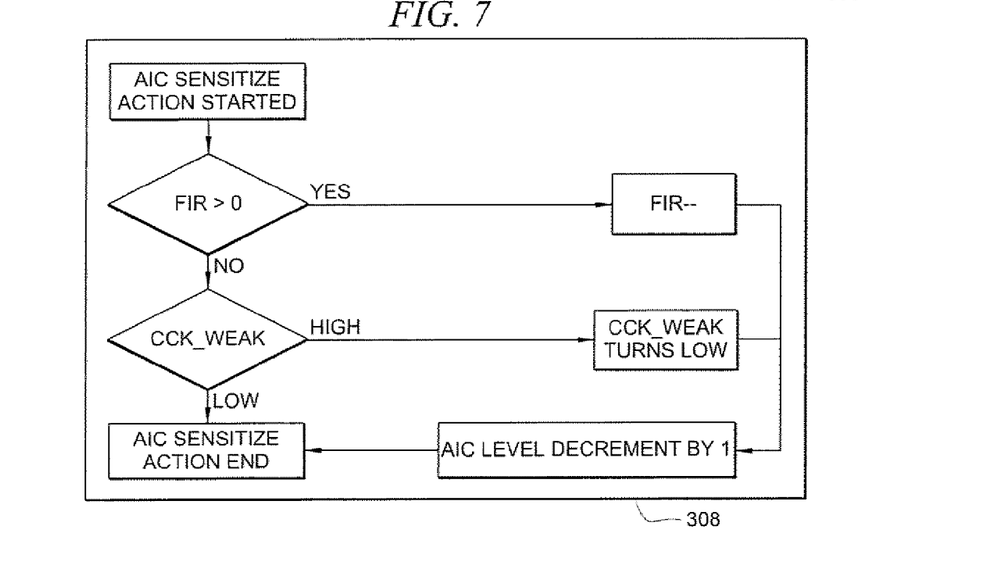
FIG. 7 shows a flow diagram of operation of the system of FIG. 1 to provide radio sensitivity sensitize action control with respect to CCK modulation of a selected radio according to an embodiment of the invention.

Directing attention to FIGS. 4-7, detail with respect to particular parameters adjusted by AIC control 110 in providing radio sensitivity adjustment is shown. Specifically, FIGS. 4 and 5 show flow diagrams illustrating operation of desensitize/sensitize action control 123 to provide radio sensitivity desensitize action control of radios 101-105 at block 306 of FIG. 3 according to an embodiment of the invention. Likewise, FIGS. 6 and 7 show flow diagrams illustrating operation of desensitize/sensitize action control 123 to provide radio sensitivity sensitize action control of radios 101-105 at block 308 of FIG. 3 according to an embodiment of the invention. As can be appreciated from FIGS. 4-7, not only may a plurality of parameters be used in AIC control between different modulation schemes, but a plurality of parameters may also be used in AIC control within any particular modulation scheme.

FIG. 4 illustrates operation of desensitize/sensitize action control 123 to provide radio sensitivity desensitize action control with respect to OFDM modulation of a selected radio, whereas FIG. 6 illustrates operation of desensitize/sensitize action control 123 to provide radio sensitivity sensitize action control with respect to OFDM modulation of a selected radio. The particular parameters adjusted in controlling OFDM modulation sensitivity of a selected radio in the illustrated embodiment include one or more power detection threshold (referred to herein as PDT), e.g., a OFDM detection threshold and a CCK detection threshold for providing interference control, carrier sense threshold (referred to herein as CST), e.g., a channel detection threshold providing spur mitigation, and weak OFDM signal detection threshold (referred to herein as OFDM_WEAK). These parameters may each be used in adjusting radio sensitivity in a different way. For example, PDT of embodiments provides a range below which a received power level is to be considered as a clear channel and above which a received power level is to be considered a busy channel, wherein with a higher PDT the receiver would be more insensitive and accept a large signal variation. CST of embodiments provides an OFDM signal desensitizing threshold, wherein with a higher desensitizing level a larger OFDM signal is required to be received. OFDM_WEAK of embodiments provides on/off control of OFDM self-correlation of weak OFDM signals, wherein if OFDM_WEAK is off OFDM signal detection would be based on signal power only.

FIG. 5 illustrates operation of desensitize/sensitize action control 123 to provide radio sensitivity desensitize action control with respect to CCK modulation of a selected radio, whereas FIG. 7 illustrates operation of desensitize/sensitize action control 123 to provide radio sensitivity sensitize action control with respect to CCK modulation of a selected radio. The particular parameters adjusted in controlling CCK modulation sensitivity of a selected radio in the illustrated embodiment include finite impulse response step (referred to herein as FIR) and weak CCK signal desensitizing level (referred to herein as CCK_WEAK). These parameters may each adjust radio sensitivity in a different way. For example, FIR provides a signal power detection desensitize threshold, wherein with a higher desensitizing level, weak signals would be filtered out. CCK_WEAK provides a correlation threshold for CCK signal detection, wherein with a higher desensitizing level a larger CCK signal is required to be received.

According to a preferred embodiment of the invention, the level of impact on radio sensitivity of each parameter within each signal type is determined in order to provide sensitivity control in ascending order of impact. That is, the various parameters are preferably provided control according to an algorithm of an embodiment of the invention to tune the less significant parameter first in order to avoid overkill of radio sensitivity suddenly. For example, the order of OFDM parameter significance of an embodiment is CST, PDT, and weak OFDM signal detection (OFDM_WEAK). Accordingly, desensitize/sensitize action control 123 of the embodiments illustrated in blocks 306 and 308 as set forth in FIGS. 4 and 6 operates to control the OFDM parameters in the order of CST then PDT then OFDM_WEAK. It should be appreciated that in the embodiments of FIGS. 4 and 6 PDT is added into the CST tuning process governed by the parameter PDT_DESENSITIZE (e.g., set to an predetermined value such as 4). Therefore, when CST reaches the value PDT_DESENSITIZE, PDT would be the next step for sensitivity tuning.

The order of CCK parameter significance of an embodiment is CCK_WEAK and FIR. Accordingly, desensitize/sensitize action control 123 of the embodiments illustrated in blocks 306 and 308 as set forth in FIGS. 5 and 7 operates to control the CCK parameters in the order of CCK_WEAK then FIR.

The parameters used by AIC control in adjusting radio sensitivity according to embodiments of the invention may be initialized in a number of ways. For example, a set of initial parameter settings determined to be acceptable for all environments may be utilized. Alternatively, a set of initial parameter settings determined (such as by modeling, empirically based determinations, etcetera) to be appropriate for an environment in which an apparatus (e.g., AP 110) is to be deployed within may be used.

In operation according to a preferred embodiment, during AIC initialization all the parameters used by AIC control in adjusting radio sensitivity are set to their lowest values. The foregoing parameters may, for example, be set as follows: PDT=0; CST=0; OFDM_WEAK=ON; CCK_WEAK= HIGH; and FIR=0. Setting such parameters to their lowest values allows the AIC process to perform desensitize and sensitize actions according, to its own design and ensures that the AIC settings are correct over different levels.

Moreover, AIC control operation according to embodiments of the invention initiates a reset process any time one of the radios resets. All counter and metrics are preferably reset to zero during the reset process in order to prevent any sudden error burst during the radio reset. However, in order to reduce the react time of AIC control during frequent radio reset, the AIC process preferably checks the access point frequency channel configuration before and after the reset process. If the channel has not changed, the AIC parameter settings for the radios and/or modulation schemes are preferably carried over after radio reset. However, if the channel has changed, the AIC parameter settings for the radios and/or modulation schemes are preferably reset to their initialization values (e.g., their lowest values).

Although embodiments of the invention have been described herein with reference to AIC control providing adjustment of radio sensitivity, it should be appreciated that the concepts of the present invention may be additionally or alternatively applied to control various operational aspects of network elements. For example, embodiments of the invention may operate to directly control transmission availability (such as by restricting particular types of communications, dropping transmissions associated with particular qualities of service, etcetera), rather than relying upon an inverse (or quasi-inverse) relationship between communication sensitivity and transmission availability.

Embodiments of the present invention provide an adaptive AIC control process, such as to adjust for various channel conditions. Accordingly, embodiments of the invention provide an adaptive mechanism for adjusting desensitizing thresholds (e.g., DesensitizeThresS and DesensitizeThresL) and sensitizing thresholds (e.g., SensitizeThresL).

Figure 8:
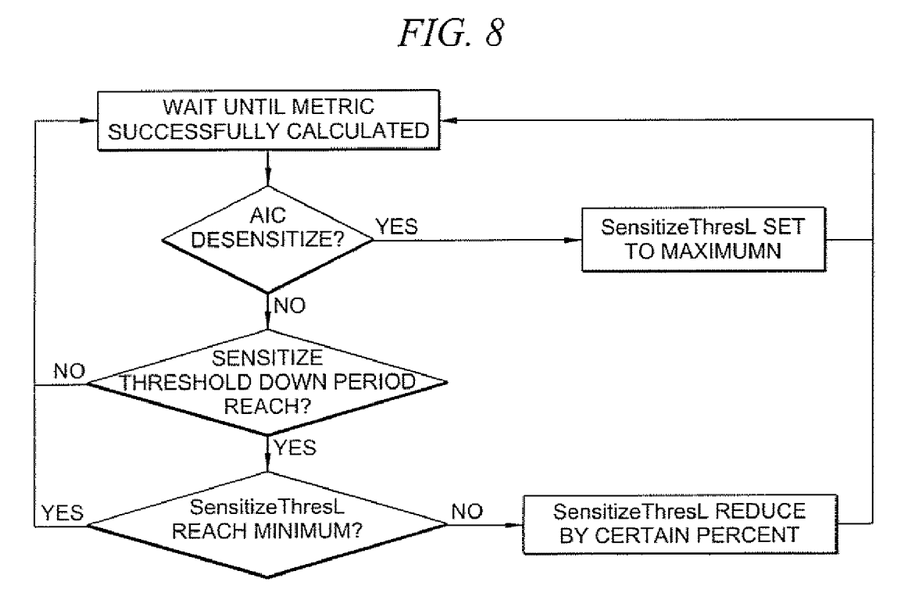
FIG. 8 shows operation of the system of FIG. 1 to provide adaptive sensitize threshold adjustment according to an embodiment of the invention.
Figure 9:
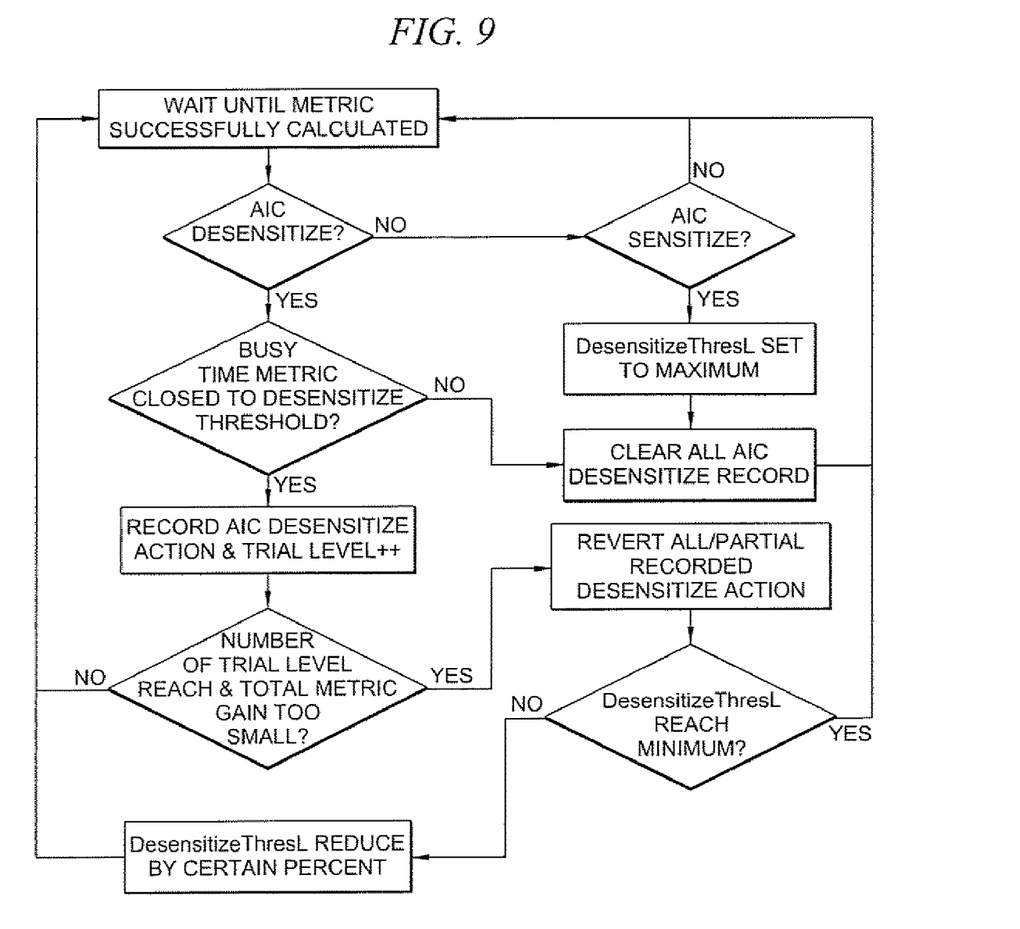
FIG. 9 shows operation of the system of FIG. 1 to provide adaptive desensitize threshold adjustment according to an embodiment of the invention.

Directing attention to FIGS. 8 and 9, flow diagrams illustrating operation of threshold adjust 124 to provide adaptive threshold adjustment according to an embodiment of the invention. Specifically, FIG. 8 shows operation of threshold adjust 124 to provide adaptive sensitize threshold adjustment and FIG. 9 shows operation of threshold adjust 124 to provide adaptive desensitize threshold adjustment.

Since a principle of AIC is to reduce the effect of interference at an apparatus at which AIC control is provided (e.g., AP 110), a sensitizing threshold (e.g., SensitizeThresL) is preferably set to a higher value initially, such that the AIC control algorithm is more reluctant to tune up radio sensitivity initially. As time passes, if no or very little AIC desensitize action is taken, the sensitizing threshold may be reduced. The sensitizing threshold may continue to be reduced iteratively, as shown in FIG. 8, it no or very little AIC desensitize action is taken, until the sensitizing threshold reaches a minimum value. If AIC desensitize action is taken, or some minimum level of AIC desensitize action is taken, the sensitizing threshold may be increased. Although the embodiment of FIG. 8 shows the sensitizing threshold being increased to a maximum value if AIC desensitize action is taken, alternative embodiments of the present invention may operate to incrementally increase the sensitizing threshold, much like the incremental decreases discussed above, if desired.

The desensitizing threshold of AIC control according to embodiments of the invention represents the minimum interference level that is to be accepted before AIC action is taken. In some circumstances, a large amount of radio sensitivity may be sacrificed in order to achieve only minor improvement in terms of interference reduction. Accordingly, an AIC desensitizing threshold may not be appropriate for all environments. Accordingly, embodiments of the invention operate to record the desensitize actions and metric gain achieved as the desensitizing threshold is approached. This information is preferably used to make a determination with respect to whether the overall gain for the next few actions is smaller than a predetermined percentage of the desensitizing threshold, as shown in FIG. 9. If the overall gain for the next few desensitize actions is smaller than the predetermined percentage of the desensitizing threshold, the recorded desensitize actions may be reversed and the desensitizing threshold reduced according to the embodiment of the invention illustrated in FIG. 9. Accordingly, the desensitizing threshold may be adaptively adjusted to provide operation optimized with respect to the environment in which the radios are deployed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining a communication time metric for a communication apparatus, wherein said communication time metric provides information with respect to an amount of time a communication media is unavailable for said communication apparatus to communicate via said media; and
   adjusting one or more parameters of said communication apparatus to achieve a desired balance between communication sensitivity of said communication apparatus and future amounts of time said communication media is unavailable for said communication apparatus, wherein said adjusting comprises at least one of:
      comparing said communication time metric to a first threshold and, if said communication time metric is less than said first threshold adjusting said one or more parameters of said communication apparatus to decrease a future error time; and
      comparing said communication time metric to a second threshold and, if said communication time metric is greater than said second threshold adjusting said one or more parameters of said communication apparatus to increase said future error time.

2. The method of claim 1, wherein said adjusting one or more parameters of said communication apparatus comprises:
   reducing said communication sensitivity when said communication time metric indicates said amount of time the communication media is unavailable for said communication apparatus to communicate is greater than a predetermined threshold.

3. The method of claim 1, wherein said adjusting one or more parameters of said communication apparatus comprises:
   increasing said communication sensitivity when said communication time metric indicates said amount of time the communication media is unavailable for said communication apparatus to communicate is less than a predetermined threshold.

4. The method of claim 1, wherein said communication time metric comprises a good time indicating a time said media was available for communication by said communication apparatus.

5. The method of claim 1, wherein said communication time metric comprises an error time indicating a time said communication apparatus received error signals.

6. The method of claim 5, wherein said determining the communication time metric comprises:
   determining a receive not clear count for said communication apparatus.

7. A method comprising:
   determining a communication time metric for a communication apparatus, wherein said communication time metric provides information with respect to an amount of time a communication media is unavailable for said communication apparatus to communicate via said media, wherein said communication time metric comprises an error time indicating a time said communication apparatus received error signals, wherein said determining the communication time metric comprises:
      determining a receive not clear count for said communication apparatus;
      determining at least one of a transmit count and a receive count for said communication apparatus; and
      subtracting said at least one of said transmit count and said receive count from said receive not clear count; and
   adjusting one or more parameters of said communication apparatus to achieve a desired balance between communication sensitivity of said communication apparatus and future amounts of time said communication media is unavailable for said communication apparatus.

8. The method of claim 7, wherein said determining at least one of said transmit count and said receive count comprises:
   determining said transmit count and said receive count; and
   determining a greater of said transmit count and said receive count;
   wherein said subtracting said at least one of said transmit count and said receive count comprises:
   subtracting said greater of said transmit count and said receive count from said receive not clear count.

9. The method of claim 1, wherein said determining said communication time metric comprises:
   determining a first error metric by dividing a time period associated with a first error time by said first error time.

10. The method of claim 1, wherein said adjusting said one or more parameters of said communication apparatus decreasing said future error time comprises:
    decreasing a receive sensitivity of said communication apparatus; and
    wherein adjusting said one or more parameters of said communication apparatus increasing said future error time comprises:
    increasing a receive sensitivity of said communication apparatus.

11. The method of claim 1, further comprising:
    determining a second communication time metric for said communication apparatus, wherein said second communication time metric provides information with respect to an amount of time said communication apparatus received error signals for a smaller window of time than a window of time associated with said communication time metric;
    comparing said second communication time metric to a third threshold; and if said second communication time metric is less than said third threshold, adjusting said one or more parameters of said communication apparatus to achieve said desired balance between said communication sensitivity of said communication apparatus and future amounts of time said communication media is unavailable for said communication apparatus.

12. The method of claim 11, wherein said determining said communication time metric comprises determining a first error metric by dividing a time period associated with a first error time by said first error time, and wherein said determining said second communication time metric comprises determining a second error metric by dividing a time period associated with a second error time by said second error time.

13. The method of claim 11, wherein said communication time metric comprises a long time window metric and said second communication time metric comprises a short time window metric.

14. The method of claim 1, further comprising:
adjusting at least one of said first threshold as a function of a number of times said one or more parameters have been adjusted to decrease said future error time and said second threshold as a function of a number of times said one or more parameters have been adjusted to increase said future error time.

15. A method comprising:
determining a communication time metric for a communication apparatus, wherein said communication time metric provides information with respect to an amount of time a communication media is unavailable for said communication apparatus to communicate via said media;
adjusting one or more parameters of said communication apparatus to achieve a desired balance between communication sensitivity of said communication apparatus and future amounts of time said communication media is unavailable for said communication apparatus;
analyzing said adjusting the one or more parameters and a resulting communication time metric as said communication time metric approaches a first threshold in operation of said communication apparatus over time;
determining whether an overall communication time metric gain for a subsequent adjusting of said one or more parameters is smaller than a predetermined percentage of said first threshold; and
reducing said first threshold if said overall communication time metric gain is smaller than said predetermined percentage of said first threshold.

16. The method of claim 1, wherein said adjusting one or more parameters of said communication apparatus comprises:
adjusting one or more receive sensitivity parameters.

17. The method of claim 1, wherein said adjusting one or more parameters of said communication apparatus comprises:
selecting a parameter of a plurality of parameters for adjustment, wherein said plurality of parameters are selected according to a predetermined hierarchy.

18. The method of claim 1, wherein said adjusting one or more parameters of said communication apparatus comprises:
selecting a radio of a plurality of radios for which one or more said parameters are to be adjusted.

19. The method of claim 18, wherein said selecting said radio of said plurality of radios comprises:
selecting a radio having a highest individual error time.

20. The method of claim 18, wherein said selecting said radio of said plurality of radios comprises:
selecting a radio having a lowest individual error time.

21. A method comprising:
monitoring operating performance of a plurality of radios to provide receive error information;
determining an error metric for said plurality of radios using said receive error information;
analyzing said error metric to determine if at least one interference rejection parameter of at least one radio of said plurality of radios is to be adjusted, wherein said analyzing said error metric comprises at least one of:
comparing said error metric to a first threshold; and
comparing said error metric to a second threshold;
selecting said at least one radio of said plurality of radios for interference rejection adjustment using said receive error information; and
adjusting one or more interference rejection parameter of said selected at least one radio in accordance with said error metric analysis, wherein said adjusting comprises:
if said error metric is less than said first threshold, adjusting said one or more interference rejection parameters to decrease receive sensitivity of a selected at least one radio; and
if said error metric is greater than said second threshold, adjusting said one or more interference rejection parameters to increase receive sensitivity of a selected at least one radio.

22. The method of claim 21, wherein said plurality of radios operate cooperatively to provide a network node.

23. The method of claim 22, wherein said network node comprises a wireless network access point.

24. The method of claim 21, wherein said error information comprises at least two of:
receive not clear information for each radio of said plurality of radios;
transmit information for each radio of said plurality of radios; and
receive information for each radio of said plurality of radios.

25. A method comprising:
monitoring operating performance of a plurality of radios to provide receive error information, wherein said error information comprises at least two of:
receive not clear information for each radio of said plurality of radios;
transmit information for each radio of said plurality of radios; and
receive information for each radio of said plurality of radios;
determining an error metric for said plurality of radios using said receive error information, wherein said determining said error metric for said plurality of radios comprises:
summing values of said receive not clear information associated with individual radios of said plurality of radios to provide a combined value;
subtracting a value of one of said transmit information and said receive information from a value of said combined value;
analyzing said error metric to determine if at least one interference rejection parameter of at least one radio of said plurality of radios is to be adjusted;
selecting said at least one radio of said plurality of radios for interference rejection adjustment using said receive error information; and adjusting one or more interference rejection parameter of said selected at least one radio in accordance with said error metric analysis.

26. A method comprising:
monitoring operating performance of a plurality of radios to provide receive error information, wherein said error information comprises at least two of:
receive not clear information for each radio of said plurality of radios;
transmit information for each radio of said plurality of radios; and
receive information for each radio of said plurality of radios;
determining an error metric for said plurality of radios using said receive error information;
analyzing said error metric to determine if at least one interference rejection parameter of at least one radio of said plurality of radios is to be adjusted;
selecting said at least one radio of said plurality of radios for interference rejection adjustment using said receive error information, wherein said selecting at least one radio of said plurality of radios for interference rejection adjustment comprises:
subtracting a value of one of said transmitting information and said receive information associated with each radio of said plurality of radios from a value of a corresponding receive not clear information to provide individual radio error values; and
analyzing said individual radio error values to select said at least one radio of said plurality of radios for interference rejection adjustment; and
adjusting one or more interference rejection parameter of said selected at least one radio in accordance with said error metric analysis.

27. The method of claim 26, wherein said analyzing said individual radio error values to select said at least one radio comprises:
identifying an individual radio value error value having a lowest value; and
wherein said adjusting said one or more interference rejection parameters comprises:
adjusting said one or more interference rejection parameters to increase receive sensitivity of said selected at least one radio.

28. The method of claim 26, wherein said analyzing said individual radio error values to select said at least one radio comprises:
identifying an individual radio value error value having a highest value; and
wherein said adjusting said one or more interference rejection parameters comprises:
adjusting said one or more interference rejection parameters to decrease receive sensitivity of said selected at least one radio.

29. The method of claim 21, wherein said plurality of radios each provide communications using a plurality of communication protocols, and wherein said selecting said at least one radio of said plurality of radios for interference rejection adjustment comprises:
selecting a particular communication protocol of said plurality of communication protocols used by said selected at least one radio for said interference rejection adjustment.

30. The method of claim 29, wherein said plurality of communication protocols comprise:
a complementary code keying (CCK) modulation protocol; and
an orthogonal frequency division multiplex (OFDM) modulation protocol.

31. The method of claim 21, wherein said one or more interference rejection parameter is selected from the group consisting of:
a power detection threshold (PDT);
a carrier sense threshold (CST); and
a weak OFDM signal detection parameter.

32. The method of claim 21, wherein said one or more interference rejection parameter is selected from the group consisting of:
a finite impulse response step (FIR); and
a weak CCK signal desensitizing level.

33. A system comprising:
a plurality of radios operable together as a network node; and
a receive sensitivity controller coupled to the plurality of radios and operable to determine a consolidated communication metric for said plurality of radios and to control a receive sensitivity parameter of a selected radio of said plurality of radios as a function of said consolidated error metric, wherein said receive sensitivity controller comprises:
a channel status consolidation circuit coupled to each radio of said plurality of radios to receive said receive not clear information therefrom, said channel status consolidation circuit operable to provide consolidated receive not clear information from said receive not clear information;
an error time calculation circuit coupled to each radio of said plurality of radios and operable to receive said transmit information and said receive information therefrom, said error time calculation circuit also coupled to said channel status consolidation circuit to receive said consolidated receive not clear information therefrom, said error time calculation circuit operable to provide consolidated error metric from said transmit information, said receive information, and said consolidated receive not clear information; and
a threshold comparison circuit coupled to said error time circuit and operable to receive said consolidated error metric therefrom, said threshold comparison circuit operable to compare said consolidated error metric to one or more threshold to determine if a radio of said plurality of radios is to be adjusted.

34. The system of claim 33, wherein said consolidated communication metric comprises a consolidated error metric.

35. The system of claim 33, wherein said network node comprises a wireless network access point.

36. The system of claim 33, wherein said plurality of radios comprise:
two or more subscriber link radios; and
one or more backhaul link radio.

37. A system comprising:
a plurality of radios operable cooperatively to provide a network node, each radio of said plurality of radios operable to provide receive not clear information, transmit information, and receive information;
a channel status consolidation circuit coupled to each radio of said plurality of radios to receive said receive not clear information therefrom, said channel status consolidation circuit operable to provide consolidated receive not clear information from said receive not clear information;

an error time calculation circuit coupled to each radio of said plurality of radios and operable to receive said transmit information and said receive information therefrom, said error time calculation circuit also coupled to said channel status consolidation circuit to receive said consolidated receive not clear information therefrom, said error time calculation circuit operable to provide consolidated receive error information from said transmit information, said receive information, and said consolidated receive not clear information; and a threshold comparison circuit coupled to said error time circuit and operable to receive said consolidated receive error information therefrom, said threshold comparison circuit operable to compare said consolidated receive error information to one or more threshold to determine if a radio of said plurality of radios is to be adjusted.

38. The system of claim 37, further comprising:

an adjustment action control circuit coupled to said threshold comparison circuit and operable to receive information with respect to a determination that said radio of said plurality of radios is to be adjusted, said adjustment action control circuit coupled to each said radio of said plurality of radios to provide control signals one or more said radios in response to said determination that said radio of said plurality of radios is to be adjusted.

39. The system of claim 37, further comprising;

a threshold adjust circuit coupled to said threshold comparison circuit and operable to adaptively adjust said one or more threshold as a function of adjustment action taken with respect to said plurality of radios.

* * * * *